W. TAYLOR.
Stovepipe Damper.
No. 103,686. Patented May 31, 1870.
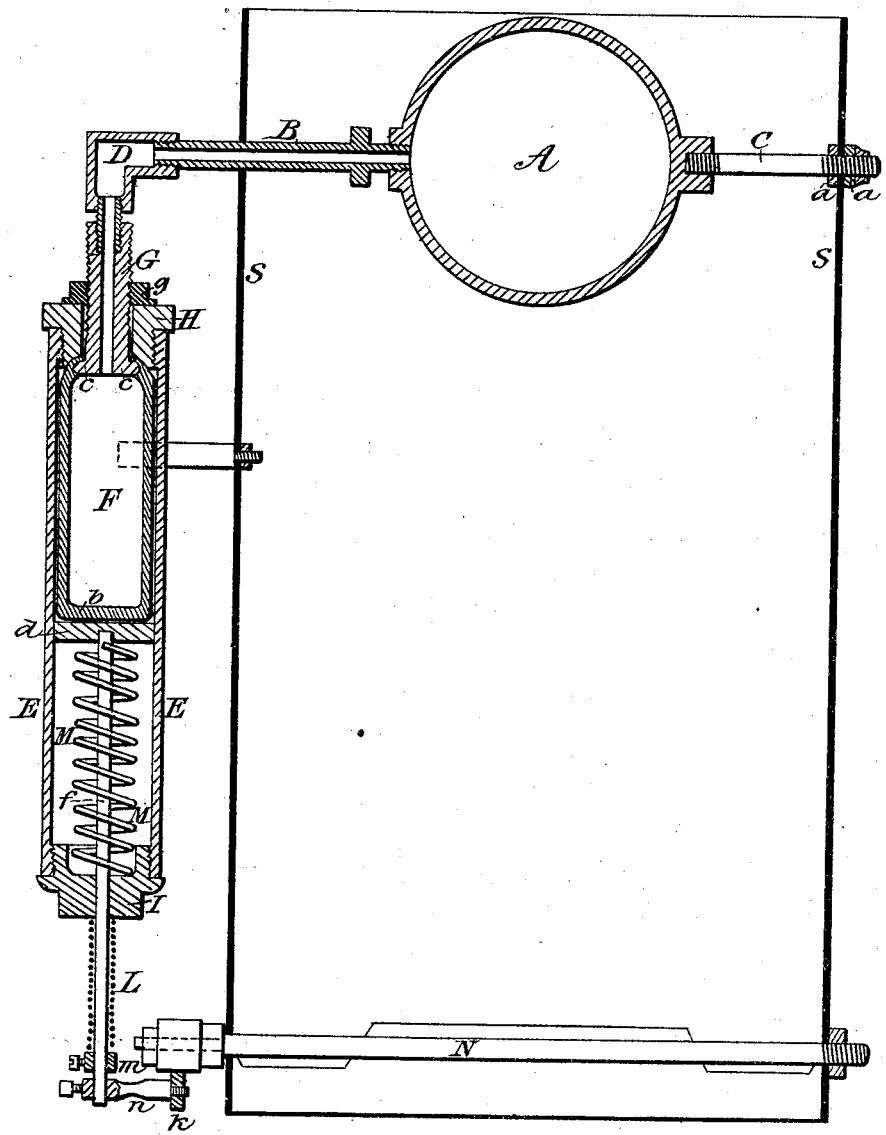
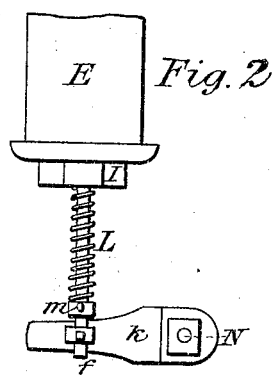

United States Patent Office.

WILLIAM TAYLOR, OF LOWELL, MASSACHUSETTS.

Letters Patent No. 103,686, dated May 31, 1870.

STOVE-PIPE DAMPER.

The Schedule referred to in these Letters Patent and making part of the same.

*To all whom it may concern:*

Be it known that I, WILLIAM TAYLOR, of Lowell, in the county of Middlesex and State of Massachusetts, have invented certain new and useful Improvements in Damper-Regulators for Stove-Pipes, of which the following is a full, clear, and exact description, reference being had to the accompanying drawing making a part of this specification, in which—

Figure 1 represents a sectional elevation, and

Figure 2, a plan of a portion of one end of the cylinder, and the arm which connects the piston-rod with the shaft of the damper.

This invention relates to that kind of damper-regulators which are used in or upon stove-pipes, and which are operated to regulate the damper and the draught or current of air by pressure of water or steam, which pressure is generated or produced by apparatus within the pipe, and in the current of heat, smoke, and gases passing from the fire.

In the construction, application, and use of my said improved damper-regulator, I first provide a hollow ball, A, having a hub at one side, and open at the opposite side.

This ball is suspended or secured within the pipe by a tube, B, screwed into the upper side of it, and by a rod, C, screwed into the lower side.

The last-named rod is secured to the shell S of the stove-pipe by nuts *a*.

The tube B extends upward, and its top end is furnished with a common quarter turn fitting D, by which the hollow ball and tube are connected with a cylinder, E, arranged above the stove-pipe.

This cylinder contains an elastic tubular sack, F, the open end of which is connected with the enlarged end *c* of a pipe, G, which is connected with the fitting D by a screw-bushing, *e*.

The tubular sack and the pipe G are connected with the cylinder by a packing-nut, H, which screws into the end of the cylinder, and by a second nut, *g*, which screws onto the pipe G against the nut H, and this draws the pipe G outward, forcing the head *c* and the drawn-over end of the sack into the recessed inner end of the nut H, and making a water or a steam-tight joint.

The tubular sack extends along in the cylinder about half the length of the latter, and where its closed end *b* comes against a disk or piston-head, *d*, provided with a rod, *f*, which passes through a nut, I, screwed into the end of the cylinder; the rod extends outward a suitable distance, and connects with an arm, K, arranged on the end of the shaft of the damper.

The rod *f* and the arm K are connected by a stud, *h*, adjustable on the rod by a set-screw.

Inside of the stud is a collar, *m*; and between this and the nut I, which forms the head of the cylinder, is a spiral spring, L, which partially balances the action of the inner spring M, the latter holds the piston-head back against the closed end of the sack, ready to be acted upon when the sack is expanded, and, as its expansion can only be endwise, being inclosed within the cylinder and nearly filling the same, the expansive force acts directly against the piston-head and through the rod *f*, and the arm K upon the shaft N of the damper, opening or closing the same in proportion to the amount of pressure transferred to the sack from the heated water in the hollow ball, passing through the tube B, the fitting D, the bushing *e*, and the button-headed tube G, into the elastic sack, and elongating the latter, and forcing the piston-head back, as before described.

The inner spring M returns the damper to its former position, or partially returns it, when the heat in the stove-pipe is diminished, and the water in the ball loses its heat, thus reducing the pressure.

It will be obvious that a heater of any other form may be substituted for the ball or spherical heater, without departing from the principles and merits of my invention.

What I claim, and desire to secure by Letters Patent, is—

1. The hollow heater A, in combination with the elastic sack F, arranged within the cylinder, and operating against the piston-head, to regulate the damper, as described, the cylinder and heater being connected by tubes or pipes, as specified, and the piston-rod with the arm on the shaft of the damper, all in the manner and for the purpose set forth.

2. The button-headed tube G, in combination with the recessed nut H, the cylinder, and the elastic sack, in the manner and for the purpose substantially as described.

WILLIAM TAYLOR.

Witnesses:
JOHN E. CRANE,
A. A. HART.